Figure 2:
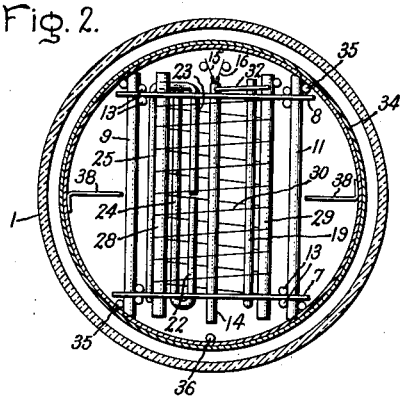

July 4, 1950   F. M. BAILEY   2,513,908
ELECTRIC DISCHARGE DEVICE OF THE INDICATOR TYPE
Filed July 24, 1945   2 Sheets-Sheet 1

Inventor:
Francis M. Bailey,
by Morton D Moose
His Attorney.

July 4, 1950           F. M. BAILEY          2,513,908
ELECTRIC DISCHARGE DEVICE OF THE INDICATOR TYPE
Filed July 24, 1945                        2 Sheets-Sheet 2
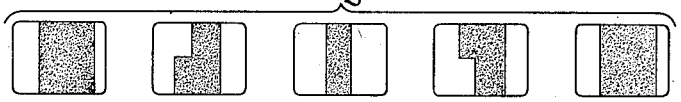
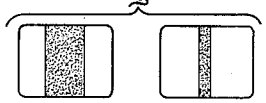
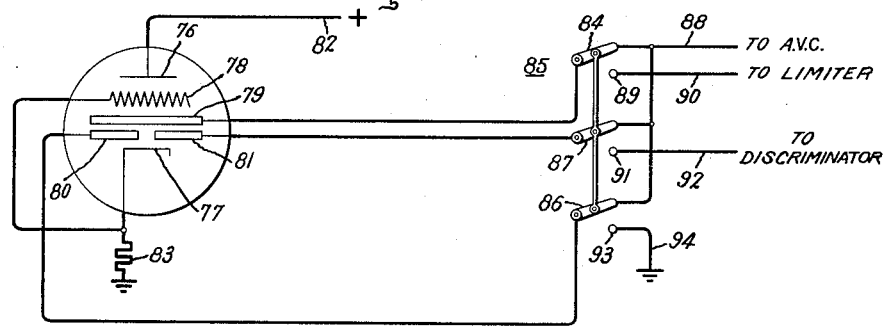
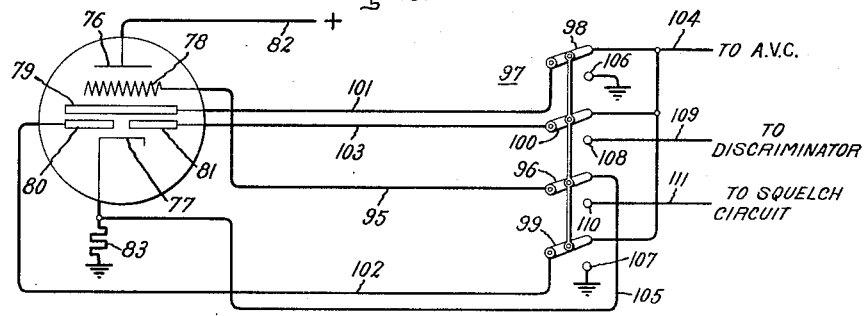
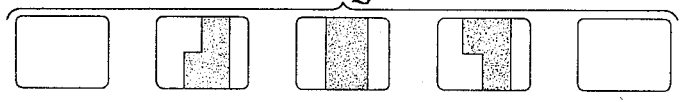
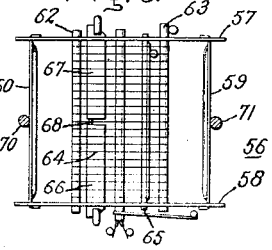
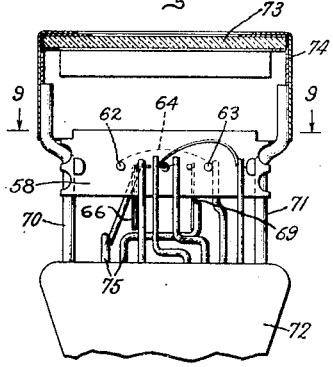
Inventor:
Francis M. Bailey,
by Merton D. Morse
His Attorney.

Patented July 4, 1950

2,513,908

UNITED STATES PATENT OFFICE 2,513,908

ELECTRIC DISCHARGE DEVICE OF THE INDICATOR TYPE

Francis M. Bailey, Scotia, N. Y., assignor to General Electric Company, a corporation of New York Application July 24, 1945, Serial No. 606,830

11 Claims. (Cl. 250—27.5)

My invention relates to electric discharge devices and more particularly to improved electric discharge devices for indicating or measuring the magnitudes or relative magnitudes of electrical quantities.

In the copending Bachman application Serial No. 557,579, filed October 7, 1944, Patent No. 2,468,814 granted November 1, 1949, and assigned to the assignee of the present invention, is described and claimed an indicating electric discharge device which is suitable for providing a visual indication of the relative magnitudes of a plurality of quantities regardless of their absolute values. My invention is in the nature of an improvement on the construction shown in the Bachman application particularly with respect to the sensitivity and sharpness of the indication provided. Devices manufactured in accordance with my invention are well suited for use in combination frequency modulation and amplitude modulation radio sets as a tuning indicator.

It is an object of my invention to provide a new and improved indicating device of the electric discharge type.

It is another object of my invention to provide a new and improved electric discharge device for providing a visual indication of the relative magnitudes of a plurality of electrical quantities.

It is still another object of my invention to provide a new and improved electric discharge device having high sensitivity.

In the illustrated embodiments of my invention the shape of the luminous display on an anode having a fluorescent coating is controlled by three electrodes, two of which are arranged in end-to-end relation and all three of which extend in a direction generally parallel to an elongated cathode. A space charge control electrode, in the form of a wire grid, is interposed between the control electrodes and the cathode on the one side and the anode having a fluorescent coating on the other side. The space charge control grid makes it possible to retard the movement of the electrons on the cathode side thereof as they move toward the anode, with the result that the control electrodes operate on the relatively slow moving electrons to produce a large amount of deflection for a relatively small change in voltage. The voltage of the space charge control member may be fixed with respect to the cathode of the device or it may be used as an intensity control to diminish the electrons reaching the anode under certain conditions such as when the set with which the indicator is associated is tuned to a frequency between adjacent stations.

Figure 3:
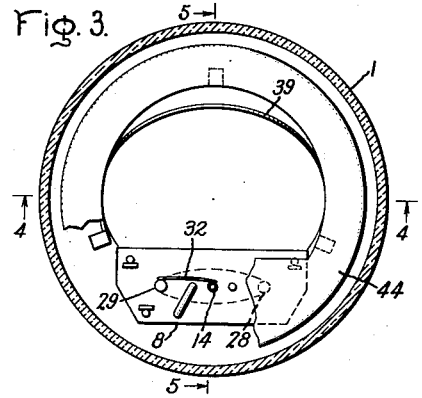
Figure 1:
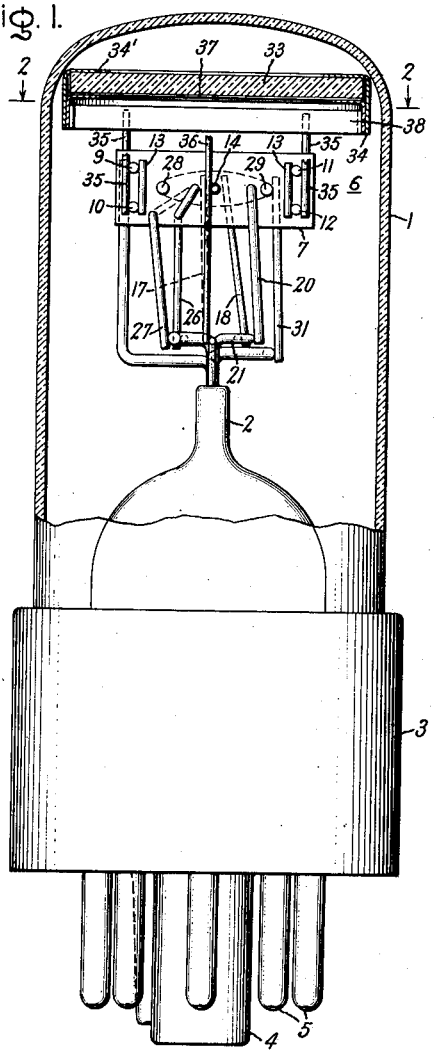
Figure 4:
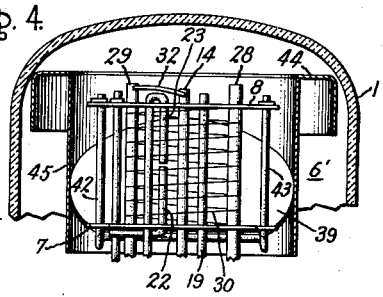
Figure 5:
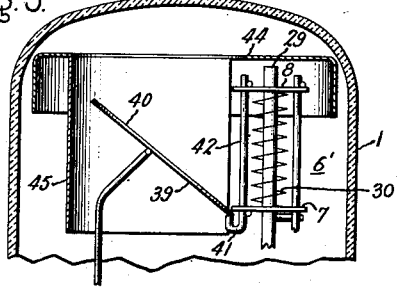
Figures 6, 7:
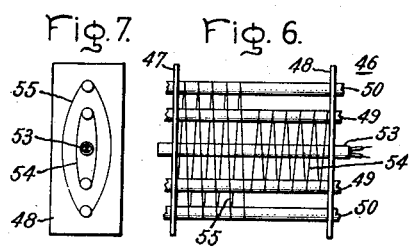

For a better understanding of my invention reference may be had to the following description taken in connection with the accompanying drawings and its scope will be pointed out in the appended claims. In the drawings, Fig. 1 is an elevational view, partially in section, of an electric discharge device embodying my invention; Fig. 2 is a sectional view, taken along the line 2—2 of Fig. 1; Fig. 3 is a plan view, in section, of a modified electrode structure embodying my invention; Fig. 4 is a sectional view, taken along the line 4—4 of Fig. 3; Fig. 5 is a sectional view, taken along the line 5—5 of Fig. 3; Fig. 6 is a plan view of an electrode assembly of a further modification of my invention; Fig. 7 is an end view of the assembly shown in Fig. 6; Figs. 8 and 9 are sectional views of a still further modification of my invention; Fig. 10 is a schematic representation of a circuit in which devices embodying my invention may be employed as a tuning indicator for a combination frequency modulation-amplitude modulation receiving set; Figs. 11 and 12 illustrate different displays obtained with the circuit of Fig. 10; Fig. 13 is a schematic representation of another circuit in which devices embodying my invention may be employed, and Fig. 14 illustrates the different displays obtained with the circuit of Fig. 13.

Referring now to Figs. 1 and 2 of the drawings, my invention is shown as embodied in an electric discharge device including a generally cylindrical envelope 1 having a stem press 2 supported from one end thereof through which the lead-in conductors of the device are sealed. The envelope is preferably provided with a base 3 of molded insulating material having a centrally located positioning post 4 and a plurality of contact prongs 5, which are secured to the insulating base and electrically connected with the various lead-in conductors. Supported within the envelope 1 from the stem press 2 is an electrode assembly designated generally by the numeral 6 and including a pair of rectangular spacers 7 and 8 formed of suitable insulating material such as mica. The spacers are retained in the desired relative positions by suitable side rods 9-12, inclusive, having positioning lugs 13 welded thereto on opposite sides of the spacers 7 and 8. The electrode assembly 6 includes an elongated cylindrical cathode sleeve 14 within which is mounted a suitable heater element having end connections 15 and 16 connected with conductors 17 and 18 which are sealed into the press 2. An elongated control electrode 19 extends between the spacer elements 7 and 8 and is connected to one of the contact prongs of the device by a conductor 20 and lead-in conductor 21. On the opposite side of the cathode 14 and preferably in a plane common to the cathode and control electrode 19 and closer to the cathode than the electrode 19 are elongated rod-like electrodes 22 and 23 arranged in end-to-end relation. These electrodes 22 and 23 are provided with reversely extending portions 24 and 25, respectively, which extend through both of the spacers 7 and 8 to provide a rigid support for the control electrodes 22 and 23. These electrodes are connected with conductors 26 and 27, respectively, which are sealed, respectively, to suitable lead-in conductors connected with different ones of the contact prongs 5. At a greater distance from the cathode 14 than the control electrodes 19, 22 and 23 and on opposite sides thereof supporting rods 28 and 29 are provided. These rods extend through both spacers 7 and 8 and provide a supporting structure for a wirelike grid or space charge control member 30. A conductor 31 connects one of the side rods 29 with one of the lead-in conductors and a corresponding contact prong 5. As illustrated in Fig. 2, the cathode and space charge control member may be electrically connected together within the envelope by a suitable conductor 32, although in some applications it is preferable to connect the space charge control electrode and the cathode to separate contact prongs.

A screen or anode having an extended planar surface is provided by a circular glass disk 33 mounted in a suitable metal frame 34 which is supported from the electrode assembly 6 by a plurality of supporting rods 35 bonded to the various side rods 9–12 of the electrode assembly. The frame includes an inwardly directed flange portion 34′ masking the edge of the disk 33 to define a rectangular display opening. A conductor 36 is connected with the supporting frame 34 and to one of the lead-in conductors. The lower surface of the disk 33 is provided with a fluorescent coating 37, such as Willemite, which may be applied by spraying after the glass has been rendered conducting by suitable treatment with tin oxide from a suitable tin chloride solution. In order to provide a sharp line-of-demarcation between the portion of the display on the screen determined by electrodes 22 and 23, respectively, I provide a metal strip 38 extending diametrically across the lower face of the screen and joined at its opposite ends to the frame 34. This strip lies directly over the gap between the electrodes 22 and 23 and tends to collect electrons which would otherwise tend to blur the display at the center of the screen as will be more apparent from the description of operation of the device which will follow at a later point in the specification.

In Figs. 3, 4 and 5 I have illustrated another embodiment of my invention which is, in general, similar to the construction shown in Figs. 1 and 2 but in which the electrode assembly is mounted vertically instead of horizontally and in which the fluorescent surface of the screen is viewed directly. The electrode assembly 6′ includes, in general, the same elements as the electrode assembly of Figs. 1 and 2 and corresponding numerals have been employed to designate the corresponding elements although, as will be clear from the drawings, certain of the elements are differently dimensioned. As indicated in Figs. 3 to 5, inclusive, the fluorescent screen is provided by a generally circular metal disk 39 having a fluorescent coating 40 on one face thereof. The screen is provided with a straight edge which is supported adjacent the lower end of the electrode assembly 6′ by an integral extension 41 formed on side rods 42 and 43 which correspond generally to side rods 9 and 11 of the electrode assembly of Fig. 1. The anode is supported at an angle of approximately 45° with respect to the axis of the envelope and is viewed directly from the end of the envelope. A suitable apertured metal disk 44 is supported above the electrode assembly to mask the assembly 6′ from view. A cylindrical shield 45 supported from the disk 44 extends around the greater portion of the screen 39 to exclude extraneous light and improve the display.

In Figs. 6 and 7 I have shown another embodiment of my invention which is somewhat simpler than the two embodiments described above and which provides a satisfactory display in some applications. As illustrated in these figures, the electrode assembly 46 includes a pair of insulating spacer members 47 and 48 through which are threaded two pairs of side rods 49 and 50. A cathode cylinder 53 is also threaded between the spacers 47 and 48 in a central position between the inner pair of side rods 49. A space charge control grid 54 is wound over the side rods 49 for one-half of the length of the cathode cylinder 53. The other half of the cathode cylinder is surrounded by control grid 55 supported from the outer side rods 50. It will be understood that the electrode assembly 46 is supported in the electric discharge device in a manner similar to the electrode assembly 6 in Figs. 1 and 2, and that it cooperates with a screen to provide a display dependent upon the relative magnitudes of the energizing voltages of the space charge control grids 54 or 55. The manner in which this modification functions will be considered in more detail at a later point in the specification.

In Figs. 8 and 9 I have shown a still further modification of my invention which is functionally the same as the modifications shown in Figs. 1–5, inclusive. The structure has been somewhat modified to improve the mechanical strength of the electrode assembly. Referring to these figures, the electrode assembly designated generally by the numeral 56 includes a pair of insulating spacer members 57 and 58 separated by a pair of sheet metal members 59 and 60 which cooperate with spacers 57 and 58 to provide a boxlike structure. A cylindrical cathode, designated by the numeral 61, extends through both of the spacers 57 and 58 in a direction parallel to the members 59 and 60 and centrally between these members. A pair of side rods 62 and 63 extend through the spacer members 57 and 58 on opposite sides of cathode cylinder 61 and in parallel relation with respect thereto. In the modification shown in Figs. 8 and 9 the space charge control grid 64 comprises a plurality of wires attached to side rods 62 and 63 and extending in a curved path over the cathode 61. The region below the cathode is not surrounded by the space charge control conductors as in the modifications described in Figs. 1–5, inclusive. This permits a more rigid supporting structure for the control electrodes arranged on opposite sides of the cathode. As indicated in the drawing, a rod-like control electrode 65 extends through the spacer members 57 in parallel and spaced relation with respect to the cathode 61. On the opposite side of the cathode and below the space charge control member a pair of control electrodes 66 and 67 are provided. These electrodes are arranged in end-to-end relation and are constructed from a pair of angularly bent sheet metal members, the ends of which are received in the spacers 57 and 58. The downwardly extending portions of the electrodes 66 and 67 are suitably secured to a sheet of insulating material 68 which holds the inner ends of the electrodes 66 and 67 in alignment. The depending portions of the electrodes 66 and 67 also provide a shield which collects electrons tending to escape from the region of the cathode to the region outside of the control grid 64. In a similar manner, a sheet metal shield 69 extending downwardly from the control electrode 65 is provided for the purpose of collecting electrons which might otherwise escape from the region below the cathode. As illustrated in Fig. 9, the electrode assembly 56 is supported from a pair of conductors 70 and 71 carried by a press 72. The transparent screen 73 is also supported from the conductors 70 and 71 by means of a suitable frame 74. The various electrodes of the electrode assembly are separately connected with the various lead-in conductors 75 which are sealed through the stem press in a manner which is well understood. In this modification, the space charge control grid 64 is brought out to a contact prong which is separate from that to which the cathode is connected. This adapts the tube for applications where separate control of grid 64 is desired such as will be described at a subsequent place in the specification in connection with Fig. 13.

The features and advantages which characterize my invention will be better understood by considering the displays obtained when the devices embodying my invention are connected in typical circuits to which they may be applied to advantage. Referring to Fig. 10, I have there shown a discharge device, constructed in accordance with the teachings of my invention, connected to function as an indicator tube for a combination frequency modulation-amplitude modulation radio receiver. The device includes an anode 76, a cathode 77, a space charge control grid 78, an elongated control electrode 79 and a pair of control electrodes 80 and 81 arranged in end-to-end relation. It will be understood that these elements of the discharge device correspond to the elements described in detail in connection with the modifications of Figs. 1 and 2, for example. In the circuit shown in Fig. 10 the anode is connected to a supply conductor 82 which is adapted to be connected to the positive direct current supply voltage and the cathode is grounded through a bias resistor 83. The space charge control member 78 is connected directly with the cathode. For the application of Fig. 10, this connection may be made either inside or outside the device. The full-length control electrode 79 is connected with one blade 84 of a transfer switch 85, while the control electrodes 80 and 81 are connected with the other blades 86 and 87, respectively, of the switch 85. The upper fixed contacts of the switch 85 are connected together and to a conductor 88 which may be energized with a direct current voltage from the automatic volume control of the receiver. The lower fixed terminal 89 is connected with a conductor 90 which is adapted to be connected with a direct current voltage from the limiter of a frequency modulation receiver. The lower fixed contact 91 is connected with a conductor 92 which is adapted to be energized with a voltage derived from the discriminator circuit of a frequency modulation receiver, and the lower terminal 93 is connected to ground by conductor 94. When the switch 85 is in the upper position, all three of the deflecting electrodes 79, 80 and 81 are energized by the output of the automatic volume control of the receiver operating as an amplitude modulation set. When the set is tuned between stations, the left-hand display of Fig. 12 is obtained, the stippled part indicating the portion of the screen which fluoresces. As the receiver is tuned to a desired signal or carrier wave, the voltage from the automatic volume control becomes larger in a negative sense and narrows the display as shown in the right-hand view of Fig. 12. When the set is operating as a frequency modulation receiver, switch 85 is moved to the lower position and as the set is tuned between stations, the display shown at the left of Fig. 11 is obtained. The voltages impressed on the control members 79, 80 and 81 are all equal and are determined by the bias resistor 83. The geometry of the electrode structure determines the area of the display obtained under these conditions. As the receiver is tuned to a received carrier wave, the limiter voltage impressed on the control electrode 79 becomes more negative and the right-hand boundary of the display moves to the left as shown in the second display of Fig. 11. Also, the discriminator voltage is assumed to be positive for the particular direction of the error in the tuning being indicated. This accounts for the wider portion of the display in the region controlled by the electrode 81 connected with the discriminator. As the receiver is brought exactly on station, the discriminator voltage is zero and the left-hand side of the display becomes a straight line with electrodes 80 and 81 at the same voltage. In a similar manner, as the set is further tuned in the same direction so that the discriminator voltage becomes negative, the fourth display shown in Fig. 11 is obtained. This display is in general similar to the second display but in a reverse sense. Finally, with the set completely out of tune the fifth display, which is the same as the first display of Fig. 11, is obtained.

The metal strip 38 of Fig. 1 collects electrons which might otherwise travel to the screen at an acute angle and tend to blur the display in the region of the step or break shown in the second and fourth views of Fig. 11.

In certain frequency modulation receiver sets a circuit, commonly called a squelch circuit, is employed for the purpose of biasing certain of the various discharge devices of the set to cut-off, to eliminate noise which is otherwise reproduced in the speaker while tuning between stations. In sets of this character, the voltage from this squelch circuit may be employed to modify the display obtained with indicating devices embodying my invention.

In Fig. 13 I have shown the discharge device connected in such a circuit. In this figure, many of the elements correspond exactly to the elements of Fig. 10 and the same reference numerals have been applied. In the arrangement shown in Fig. 13, it is necessary that the space charge control grid be brought out separately from the cathode and, as illustrated, is connected with a conductor 95, which is connected with one of the movable contacts 96 of a transfer switch 97. The control electrodes 79, 80 and 81 are connected respectively with the movable contacts 98, 99 and 100 of switch 95 by conductors 101, 102 and 103, respectively. The stationary contacts adapted to be engaged by movable contacts 98, 99 and 100 in the upper position of switch 97 are connected together and to a conductor 104, which is adapted to be energized by voltage derived from the automatic volume control circuit. The stationary contact which is engaged by the movable contact 96 in the upper position of the switch 97 is connected to the cathode 77 by conductor 105. In the lower position of the switch 97, contact 98 is connected through stationary contact 106 to ground; contact 99 is connected through contact 107 to ground; contact 100 is connected through contact 108 to conductor 109 which is adapted to be energized by a direct current voltage derived from the discriminator circuit of the receiving set, and contact 96 is connected through contact 110 and conductor 111 to the output of the squelch circuit of the receiver. For operation of the set as an amplitude modulation receiver, the displays obtained are the same as those illustrated in Fig. 12. With the switch 97 moved to its lower position, the displays will, in general, be the same as those described in connection with Figs. 10 and 11, but when the set is tuned between stations there will be no illuminated portion of the screen at all. This condition is obtained as a result of applying the negative voltage of the squelch circuit to the space charge control member 78 to bias the indicating tube to cut-off. This results in a marked contrast between the displays obtained when the set is tuned between stations and when the set is tuned approximately on station.

In the various modifications of my invention described, the continuous or full length control electrode on one side of the cathode has been referred to as located at a greater distance from the cathode than the half-length electrodes. This arrangement produces a desirable result in the display obtained in that there is a change in the boundary of the display controlled by the full-length electrode after the other more closely located electrodes have ceased to produce further change in the display. The overall result is that a change in display is obtained over a greater range of tuning conditions with the unsymmetrical arrangement of opposing electrodes.

For indicating the tuning of a frequency modulation set with the embodiment of my invention shown in Figs. 6 and 7 the space charge control grids 54 and 55 may be energized, respectively, with a voltage derived from the discriminator and a reference voltage which may be ground if a cathode biasing resistor is employed.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States, is:

1. An electric discharge device comprising an elongated cathode, an anode having an extended surface including a material which fluoresces when bombarded by electrons, a space charge electrode interposed between said cathode and said anode, a pair of elongated control electrodes mounted in end-to-end relation between said cathode and said space charge electrode, and a third control electrode mounted in spaced and generally parallel relation with respect to said cathode and said pair of control electrodes whereby, when the tube is in use, a luminous display is provided on said anode having a straight line boundary on one side determined by the voltage of said third electrode and a broken line boundary on the other side determined by the relative magnitudes of the voltages impressed on said pair of control electrodes.

2. An electric discharge device comprising an elongated cathode, an anode spaced from said cathode and having an extended surface including a material which fluoresces when bombarded by electrons, a space charge electrode electrically insulated from said anode and interposed between said cathode and said anode, and a pair of elongated control electrodes mounted in end-to-end relation in a direction transverse with respect to the direction of the spacing between the anode and cathode and between said cathode and said space charge electrode.

3. An electric discharge device comprising an elongated cathode, an anode having an extended surface including a material which fluoresces when bombarded by electrons and spaced from said cathode in a direction perpendicular to the direction of elongation of said cathode, a space charge electrode electrically insulated from said anode and interposed between said cathode and said anode, a pair of control electrodes mounted in spaced and generally parallel relation with respect to each other and with respect to said cathode and on the cathode side of said space charge control electrode.

4. An electric discharge device comprising an elongated cathode, electrode means spaced from said cathode for collecting electrons emitted from said cathode, a space charge control electrode electrically insulated from said anode and interposed between said cathode and said electrode means, and a pair of elongated control electrodes mounted in end-to-end relation with respect to the direction of the spacing between the cathode and anode and between said cathode and said space charge control electrode.

5. An electric discharge device comprising an elongated cathode, an anode having an extended surface including a material which fluoresces when bombarded with electrons, control means including a wire grid structure interposed between said anode and said cathode, said control means having two mutually insulated portions respectively located opposite the opposite ends of said cathode, and means for energizing said portions of said control means each form a separate voltage to provide a display on said anode surface in accordance with the relative magnitudes of said separate voltages.

6. An electric discharge device comprising an anode having an extended surface including material which fluoresces when bombarded by electrons, an electrode assembly including a pair of insulating members, means maintaining said members in spaced relation, an elongated cathode supported at its opposite ends from said members, a pair of control electrodes positioned between said insulating members in end-to-end relation, means including supporting members received at opposite ends in openings through said insulating members for supporting said control electrodes in mutually insulated relation, and means for energizing said control electrodes with separate voltages to control the display on said anode provided by electrons emitted by said cathode in accordance with the relative magnitudes of said voltages.

7. An electric discharge device comprising an elongated cathode, an anode having an extended surface including a material which fluoresces when bombarded by electrons, a pair of control members mounted in end-to-end relation and extending substantially parallel to said cathode for controlling the display on said anode in accordance with the relative magnitudes of the energizing voltages of said control electrodes, and an elongated member of conducting material adjacent said anode and extending in a direction substantially perpendicular to said cathode for collecting electrons approaching said anode from the vicinity of the gap between the ends of said control electrode.

8. An electric discharge device comprising an elongated cathode, an anode having an extended surface including a material which fluoresces when bombarded by electrons, a pair of control members mounted in end-to-end relation and extending substantially parallel to said cathode for controlling the display on said anode in accordance with the relative magnitudes of the energizing voltages of said control electrodes, and an elongated member of conducting material adjacent said anode and lying in a plane perpendicular to said cathode and including the gap between the ends of said electrodes for collecting electrons approaching said anode at an angle to said plane.

9. An electric discharge device comprising an elongated cathode, an anode having an extended surface including a material which fluoresces when bombarded by electrons, an electrostatic control member interposed between said cathode and said anode and a pair of control elements mounted in end-to-end relation on the cathode side of said electrostatic control member, lead-in conductor means connected with one of said control members for the energizing said one of said control members with a reference voltage, lead-in conductor means connected with the other of said controlling members for energizing said other of said control members with a voltage derived from the discriminator circuit of a frequency modulated radio receiver, and lead-in conductor means for energizing said electrostatic control member with a voltage derived from the squelch circuit of a frequency modulated receiver.

10. An electric discharge device comprising an anode having an extended planar surface including a material which fluoresces when bombarded by electrons, an electrode assembly including an elongated cathode and a control member, an elongated envelope, means supporting said electrode assembly in said envelope with said cathode extending in a direction parallel to the axis of said envelope, means supporting said anode member in a plane extending at a substantial angle with respect to the axis of said envelope and with said surface facing the end of said device, and shielding means surrounding said anode and masking said electrode assembly from view.

11. An electric discharge device comprising an anode having an extended surface including material which fluoresces when bombarded with electrons, an electrode assembly including a pair of insulating members, means maintaining said members in spaced relation, an elongated cathode supported at its opposite ends from said members, a pair of control electrodes positioned between said insulating members in end-to-end relation, and means including supporting members received at opposite ends in openings through said insulating members for supporting said control electrodes in mutually insulated relation.

FRANCIS M. BAILEY.

REFERENCES CITED

The following references are of record in the file of this patent:

UNITED STATES PATENTS

| Number | Name | Date |
| --- | --- | --- |
| 2,163,546 | Clothier | June 20, 1939 |
| 2,243,408 | Anderson et al. | Feb. 27, 1941 |
| 2,243,034 | Heins | May 20, 1941 |
| 2,252,580 | Rothe et al. | Aug. 12, 1941 |
| 2,394,857 | Hultquist | Feb. 12, 1946 |
| 2,412,350 | Morgan | Dec. 10, 1946 |